May 7, 1968   M. D. SPANTON, JR., ET AL   3,381,907
COIL LEG RETAINER
Filed April 14, 1966   4 Sheets-Sheet 3

INVENTORS
MILTON D. SPANTON, JR.
MELVIN J. STRAUB
BY
Braddock & Burd
ATTORNEYS

May 7, 1968 M. D. SPANTON, JR., ET AL 3,381,907
COIL LEG RETAINER
Filed April 14, 1966
4 Sheets-Sheet 4
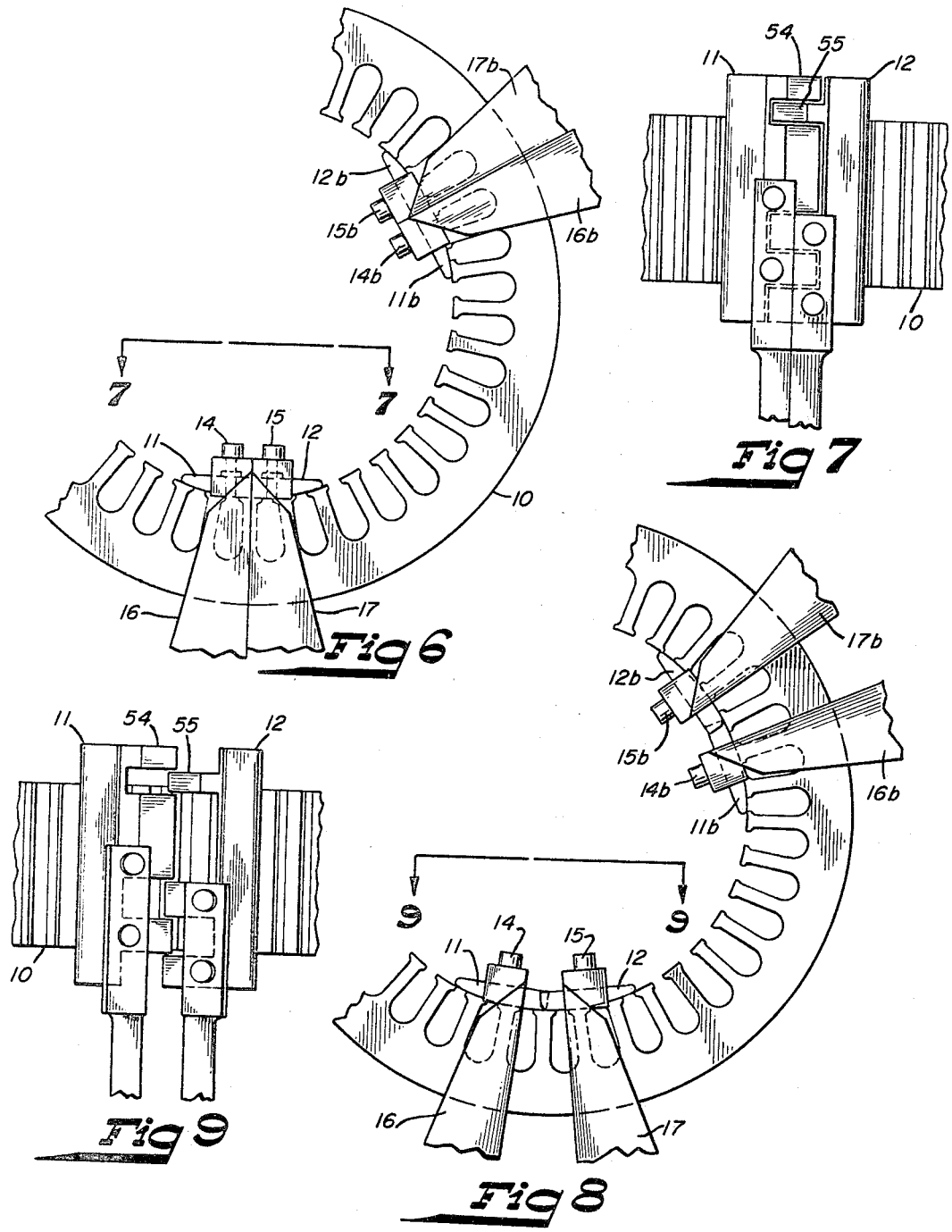
INVENTORS
MILTON D. SPANTON, JR.
MELVIN J. STRAUB
BY
Braddock & Burd
ATTORNEYS 3,381,907
COIL LEG RETAINER
Milton D. Spanton, Jr., Minneapolis, and Melvin J. Straub, Hopkins, Minn., assignors to Possis Machine Corporation, Minneapolis, Minn., a corporation of Minnesota
Filed Apr. 14, 1966, Ser. No. 542,578
13 Claims. (Cl. 242—1.1)

ABSTRACT OF THE DISCLOSURE

During the winding of a slotted stator core, a plurality of pairs of retaining members are disposed in the bore of the stator core to retain the coils already wound. Each of a pair of retaining members is mounted on a separate concentric ring and each cooperating pair have interleaved portions arranged so that relative rotation of the concentric rings will vary the spacing between the retaining members of each pair and thus the number of slots covered.

---

This invention is concerned with production apparatus, and more particularly with improved apparatus for the automatic placement of windings in a slotted core, such as a stator core.

Briefly described, the apparatus of this invention comprises a device for retaining coils that have just been wound in the slots of a stator core while the core is being indexed for further winding and when the coils are out of register with the winding machine structure around which the coils are formed. The apparatus includes multiple pairs of inter-leaved ski-shaped members that can be extended and retracted with respect to each other, as required. Extension and retraction is achieved by use of a pair of rings attached to a drive member that provides relative motion between the rings. Each of the rings is connected through an arm, which is in turn connected to the ski-like retainer. The arms can be pivotally connected to the rings to allow movement of the retaining members away from the slots in the core.

In the drawings:

FIG. 6 is an enlarged fragmentary representation of the retaining members and a portion of the core as shown in FIG. 1, and drawn to the same scale as FIG. 4;

FIG. 7 is a still further enlarged fragmentary view taken along the line 7—7 of FIG. 6, and also drawn to the same scale as FIG. 4;

FIG. 8 is a view similar to FIG. 6 except that the retaining members are shown in the separated position, and also drawn to the scale of FIG. 4; and FIG. 9 is a fragmentary view taken along the line 9—9 of FIG. 8 and similar to FIG. 7, except that the retaining members are shown in the separated position, and also to the scale of FIG. 4.

Figure 1:
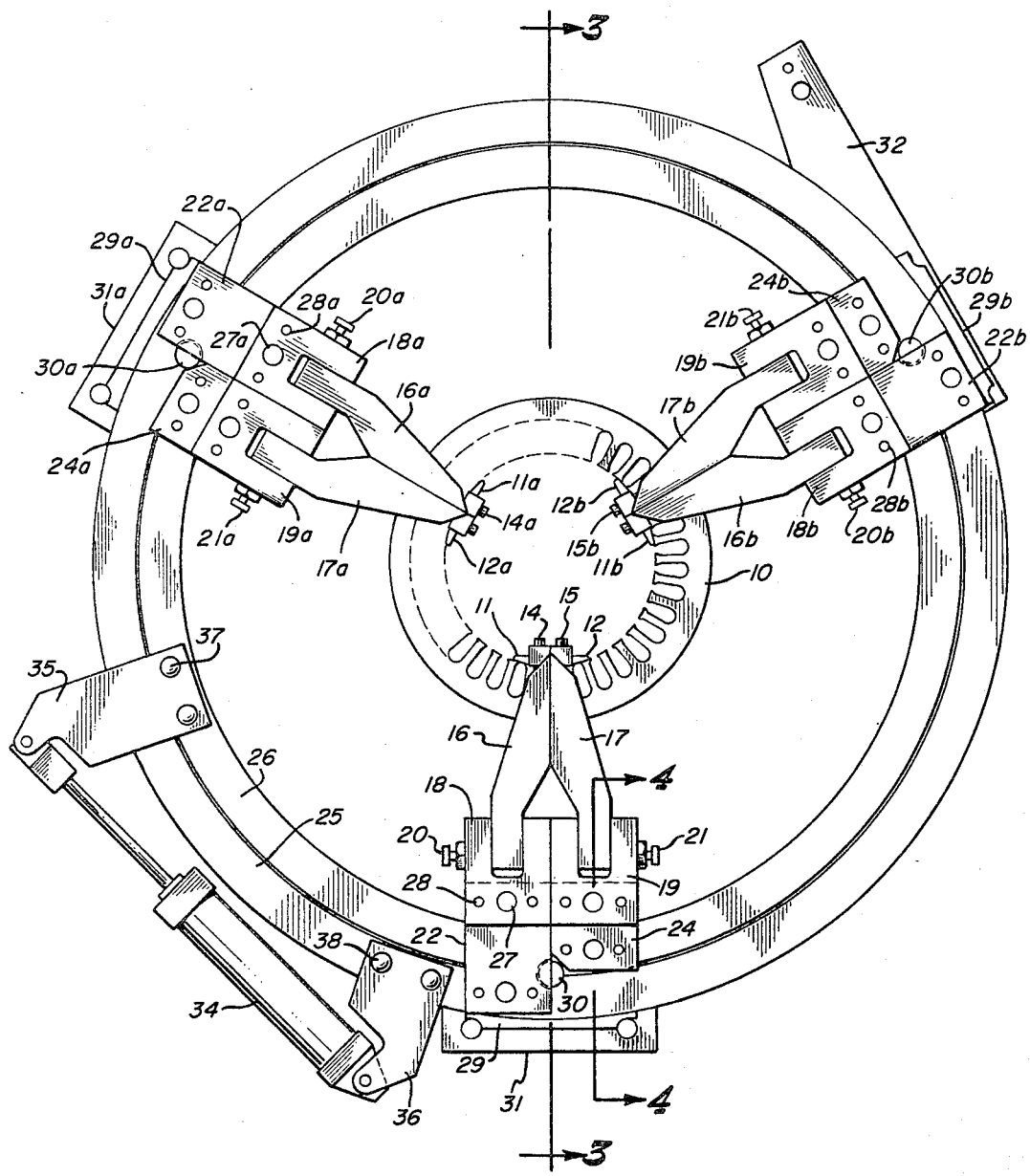
FIG. 1 is an end elevation of the retaining member structure with a representation of a slotted core, showing the relative positions of the two with respect to each other during the winding process.

Referring first to FIG. 1 there is shown a core 10, such as a stator core, supported by automatic winding machine structure (not shown). It will be understood that further winding apparatus is present for winding wires or coils into the slots of winding 10 according to a predetermined pattern. Because this apparatus is not material to this invention, it will not be shown for purposes of keeping the drawings as clear and understandable as possible. It will be understood that the form of the winding structure may be widely varied and still be used with the apparatus of this invention.

As coils are wound by the winding apparatus, and the core 10 indexed to present various slots to the winding apparatus, there will be legs of coils in the various slots of core 10 that do not fall directly under the tooling over which coils are wound. The legs of these coils, particularly when the structure that forms new coils is placed in winding position, tend to have leverage applied to them that will allow them to be forced out of the slots into which they have been wound; and when they are in the upper end of the structure, the coils might be inclined to be pulled out of the slots by gravitational forces.

To hold the coils in the slots there are provided a plurality of pairs of retaining members 11 and 12, 11a and 12a, and 11b and 12b, for example. Because the apparatus for each pair of retaining members is substantially identical, further description in this specification will be limited to the apparatus connected to retaining members 11 and 12.

Bolts 14 and 15 secure retaining members 11 and 12, respectively, to the ends of a pair of arms 16 and 17. Details of this connection can best be seen by reference to FIG. 3, in which member 12 is clearly shown secured by screws 15 to the outer reach of arm 17. Arms 16 and 17 are pivotally supported in a pair of blocks 18 and 19, respectively. Arms 16 and 17 are normally held in pivot blocks 18 and 19 in the operating position illustrated, for example, in FIG. 3, by spring tension. Arms 16 and 17 can be pivoted to an unoperative position away from core 10, and locked there during loading and unloading of cores such as 10. Operation and structure of the lock members and spring tension members will be described in detail below in the discussion of FIGS. 4 and 5. Suffice it to say at this time that by depressing releases 20 and 21, arms 16 and 17 may be pivoted about axes extending through the lower portions of arms 16 and 17 and thereby be swung toward and from core 10.

Blocks 18 and 19 are respectively supported by a pair of spacers 22 and 24. Spacer 22 is connected to a ring 25, while spacer 24 is connected to a ring 26. In FIG. 1, the larger circle on block 18, designated 27, represents a cap screw securing block 18 to spacer 22, while the smaller circles, designated 28, represent dowel pins for precise location. It is apparent from FIG. 1 that each of blocks 18 and 19, and spacers 22 and 24, have a cap screw and dowel pin securing means for precisely locating them with respect to the various members to which they are secured.

Figure 4:
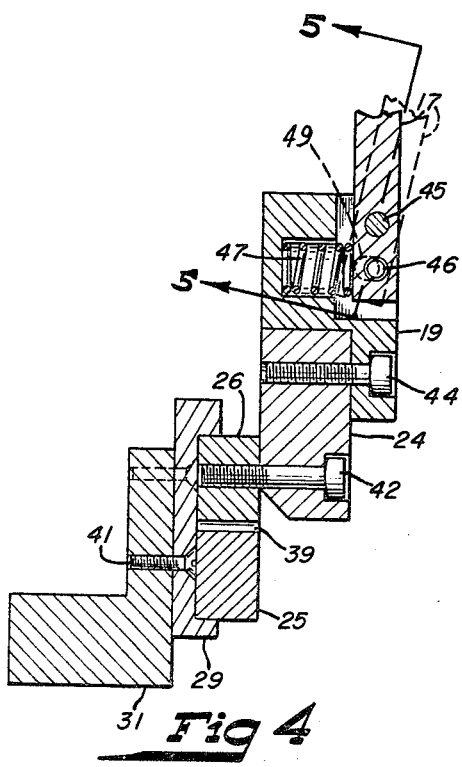
FIG. 4 is an enlarged fragmentary sectional view taken along the line 4—4 of FIG. 1.

A ring guide member 29 supports and guides the peripheral edges of both of rings 25 and 26. Rings 25 and 26 are held in guide member 29 by means of headed members such as shown at 30. Member 30 may be a shoulder screw with a washer providing a broad flat surface engaging surfaces of rings 25 and 26 to hold them in ring guide member 29. As best seen in FIG. 4, ring guide member 29 is supported by a mounting block 31. Block 31 is mounted on the automatic winding apparatus (not shown).

Figure 2:
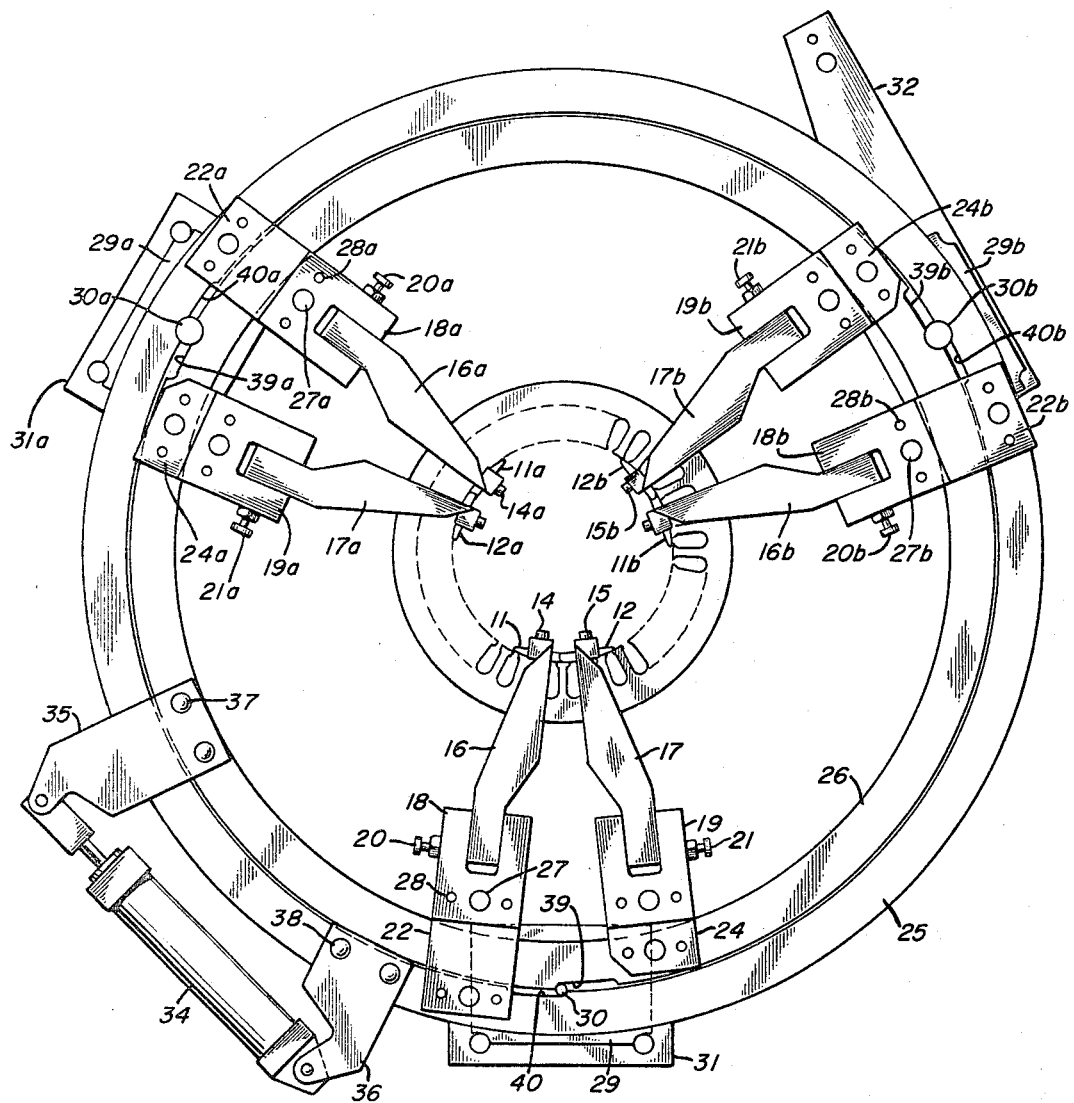
FIG. 2 is a view similar to FIG. 1 with the skis having been moved relative to each other to cover a different portion of the slots in the core.

Rings 25 and 26 can be moved relative to each other by any suitable structure such as linear motor 34, here shown as an air cylinder. Cylinder 34 is secured to an upper bracket 35 and a lower bracket 36. Bracket 35 is secured to ring 26 by bolts 37. Bracket 36 is secured to ring 25 by bolts 38. When air cylinder 34 is expanded as shown in FIG. 1, retaining members 11 and 12 are close together, that is inter-leaved, and the device is in the position in which it would be at the time that winding is taking place. At the termination of any winding for a given set of coils, retaining members 11 and 12 are separated to cover the slots in core 10 into which windings have just been placed, for holding the coils within the slots while the core is being indexed for further winding. This is best illustrated in FIG. 2, where cylinder 34 can be seen in a contracted position, thus causing relative movement between rings 25 and 26. Also apparent from FIG. 2 are cut-away portions of adjacent surfaces of rings 25 and 26, here designated, respectively, 39 and 40. These elongated slots 39 and 40, in conjunction with the shank of member 30, provide a stop or limit to the relative movement of rings 25 and 26. Whichever of rings 25 and 26 begins moving first due to force applied from cylinder 34, at least some force will be applied to the opposite ring, because it will be the leverage point from which the first ring is caused to move by the cylinder. Further, both of rings 25 and 26 may move simultaneously. However, if one of rings 25 and 26 moves less easily than the other, the first ring to have the end of its elongated slot 39 or 40 reach the shank of member 30 will have to stop moving, and thereafter all of the moving force from cylinder 34 will be applied to the opposite ring until it also has the end of its elongated slot 39 or 40 engage the shank of member 30, at which point the expansion of retaining members 11 and 12 will be completed. In FIG. 2, the head of member 30 has been omitted to make clear the interaction of the elongated slots 39 and 40 with the shank of member 30.

Figure 3:
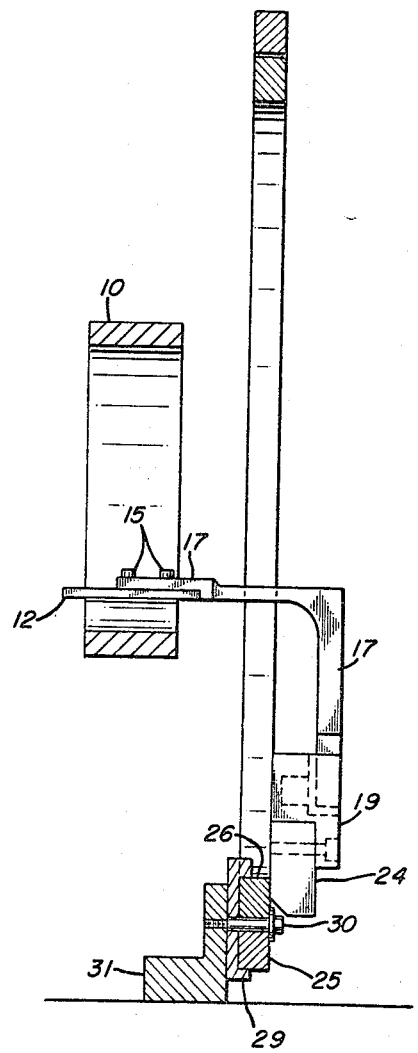
FIG. 3 is a sectional view taken along the line 3—3 of FIG. 1.

Referring now to FIG. 4, it can be seen that block 31 supports ring guide member 29, which is secured to block 31 by a pair of counter sunk bolts 41. Rings 25 and 26 are mounted in guide member 29 by means of member 30, as best seen in FIG. 3. Member 30 is not shown in the sectional view of FIG. 4. In FIG. 4, spacer 24 is shown connected by a bolt 42 to ring 26. Block 19 is in turn shown connected to spacer 24 by a bolt 44. Arm 17 is connected to block 19 by a pivot bolt 45. A portion of a lock pin 46 is also shown in position in block 19 and arm 17. The operation and structure of lock pin 46 will be more fully described below. There is also shown mounted in a recess in block 19 a spring 47. Spring 47 is positioned to yieldingly bias pivotally mounted arm 17 towards the closed position, that is, towards the position in which retaining member 12 will be in its operative position.

Figure 5:
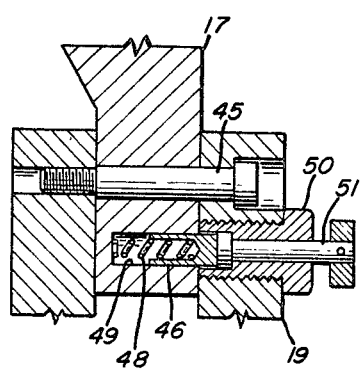
FIG. 5 is a still further enlarged fragmentary sectional view taken along the line 5—5 of FIG. 4.

The operation of the lock members of the apparatus of this invention may best be seen by reference to FIG. 5. In FIG. 5 it will be seen that arm 17 includes a third cavity 49, in which is yieldingly mounted a lock pin 46, biased by a spring 48 outwardly from cavity 49. A bushing 50 in lock 19 contains a second cavity in which is mounted release member 21 having a headed shaft 51. When the two cavities are aligned, pin 46 extends into the cavity in bushing 50 to keep arm 17 from pivoting about pivot bolt 45. When member 21 is pushed inwardly, the head of shaft 51 forces pin 46 against spring 48 and back into cavity 49. Note that the head of member 51 is too large to enter cavity 49, and therefore arm 17 is free to pivot when member 21 is in its depressed position. When member 21 is released, and cavity 49 is aligned with the cavity in bushing 50, pin 46 will again extend outwardly due to the action of spring 48 and lock arm 17 in position. The alignment of the two cavities is such that pin 46 will lock arm 17 when it is in its unoperative position, that is, when arm 17 is pivoted to displace member 12 from the slots in core 10. When the lock is released, spring 47 will return arm 17 and member 12 to the operative position, as shown in FIG. 5.

Referring now to FIGS. 6–9, the structure of retaining members 11 and 12 and their respective securing means can be seen in close proximity. In FIG. 7 it is apparent that member 11 has a finger 54 and member 12 a finger 55. When cylinder 34 is expanded, as shown in FIG. 1, fingers 54 and 55 will inter-leave to place members 11 and 12 in adjacent position as shown in FIGS. 6 and 7. When cylinder 34 is contracted, as shown in FIG. 2, members 11 and 12 will be in a separated position, as shown in FIGS. 8 and 9.

It is apparent from the above description that the apparatus of this invention provides unique structure which adds to production capabilities of automatic wire winding apparatus. It is understood that though many of the above descriptions were of a single retaining member and its associated structure, that the retaining members all have substantially the same structure and thus the descriptions apply to all such retaining members and all pairs of inter-leave retaining members. Various modifications may be made in the above described structure, such as the use of a mounting block 32 in place of the described mounting block 31 or 31a, without departing from the spirit and scope of the invention.

The embodiments of the invention in which an exclusive property or privilege is claimed are defined as follows:

1. In winding apparatus in which coils are wound into a plurality of slots in a core, the improvement comprising:
    at least a pair of coil retaining means adapted to be selectively moved relative to each other for placement over a selected number of the slots in a core for retaining wound coils therein, said pair of retaining means including means cooperating to cover more slots when said retaining means are moved apart;
    arm means connected to each of said retaining means;
    mounting means connected to said arm means; and
    movable means connected to said mounting means for imparting selected relative motion to said pair of retaining means.

2. The apparatus of claim 1 in which said cooperating means include:
    protrusions on adjacent sides; and
    said protrusions adapted to inter-leave each other so that said retaining means cover a minimum of slots when moved together and a maximum of slots when moved apart.

3. The apparatus of claim 1 in which said mounting means include:
    pivot means connecting said arm means to said mounting means for pivoting said retaining means into and out of proximity with the slots in the core.

4. The apparatus of claim 3 in which said pivot means comprise:
    a pivot bolt mounting said arm means to said mounting means;
    a first cavity formed in said arm means;
    a second cavity formed in said mounting means;
    a lock pin mounted in said first cavity and yieldingly biased toward said second cavity, so that when said cavities are aligned said pin extends into said second cavity to prevent pivoting of said arm means;
    lock release means having a portion movably mounted in said second cavity so that motion of said lock release means forces said pin into said first cavity to permit pivoting of said arm means.

5. The apparatus of claim 1 in which said movable means comprises:
    first and second rings;
    means movably mounting said rings;
    means connecting said first ring to one of said mounting means;
    means connecting said second ring to another of said mounting means; and
    drive means connected to said first and second rings for imparting relative motion thereto, to move said retaining means together and apart.

6. The apparatus of claim 5 including:
    means concentrically mounting said rings; and
    stop means connected to said rings for limiting the relative motion thereof.

7. The apparatus of claim 6 in which said stop means comprises:
a first elongated notch formed in said first ring;
a second elongated notch formed in said second ring;
said notches formed in adjacent sides of said rings;
means mounting shank means to extend through said notches when said notches are aligned; and
the diameter of said shank means being greater than the depth of either of said notches, so that the relative movement of said rings is limited by the ends of said notches striking said shank.

8. The apparatus of claim 5 in which said drive means comprises:
linear motor means connected between said first and second rings.

9. In automatic winding apparatus in which a substantially ring-shaped core having a plurality of slots in its inner planar surface has coils wound in the slots, the improved apparatus for retaining wound coils in the slots comprising:
at least a pair of inter-leavable retaining means mounted adjacent the inner planar surface;
a pair of arms, one connected to each of said retaining means and extending at substantially right angles therefrom away from the center of the ring-shaped core;
first and second rings, said rings both having greater inside diameters than the outside diameter of the ring-shaped core;
first means concentrically mounting said rings and said core;
second means connecting a first of said arms to said first ring;
third means connecting a second of said arms to said second ring; and
drive means connected to said rings for imparting relative motion thereto for moving said retaining means between an interleaved and a separated position.

10. The apparatus of claim 9 in which:
said retaining means have a substantially ski-shaped side adjacent the inner planar surface of the ring-shaped core to facilitate movement of said retaining means along the inner planar surface.

11. The apparatus of claim 9 in which said second and third means each include:
pivot means connecting said arms to said first and second rings, respectively, for pivoting said retaining means out of proximity with the inner planar surface of said core.

12. The apparatus of claim 9 in which said second and third means each comprise:
a block mounted on the respective of said rings;
a pivot bolt connecting said arm to said block;
a first recess in said arm;
a second recess in said block;
a lock pin mounted in said first recess and yieldingly biased toward said second recess, for locking said arm when said recesses are adjacent; and
means mounted in said block for forcing said pin from said second recess to permit pivoting of said arm.

13. A method of retaining windings placed in the slots of a slotted electrical machine core member while additional windings are being placed therein comprising the steps of:
providing a plurality of expandable retaining members;
placing the retaining members adjacent entrances to electrical machine core slots not having windings then being placed in them, said members then being contracted; and
expanding the retaining members to cover the entrances to slots into which windings have just been placed as the winding machine indexes to a new position to wind additional coils.

References Cited
UNITED STATES PATENTS

| | | | |
|---|---|---|---|
| 1,635,677 | 7/1927 | Jones et al. | 242—13 |
| 2,284,115 | 5/1942 | Wirth | 242—13 |
| 2,972,449 | 2/1961 | Roberts | 242—1.1 |
| 3,006,564 | 10/1961 | Hambleton | 242—13 |
| 3,187,784 | 6/1965 | Caldwell | 242—13 X |

BILLY S. TAYLOR, *Pirmary Examiner.*